US006987977B2

(12) United States Patent
Lockhart

(10) Patent No.: US 6,987,977 B2
(45) Date of Patent: *Jan. 17, 2006

(54) METHOD AND APPARATUS FOR PROVIDING ENHANCED COMMUNICATION CAPABILITY FOR MOBILE DEVICES ON A VIRTUAL PRIVATE NETWORK (VPN)

(75) Inventor: Stanford Wayne Lockhart, Saint John (CA)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 10/323,450

(22) Filed: Dec. 17, 2002

(65) Prior Publication Data
US 2003/0125048 A1 Jul. 3, 2003

Related U.S. Application Data

(63) Continuation of application No. 09/452,768, filed on Dec. 1, 1999, now Pat. No. 6,496,702.

(51) Int. Cl.
*H04Q 7/20* (2006.01)
(52) U.S. Cl. ............................. 455/456.1; 455/404.2; 455/414.2
(58) Field of Classification Search ................ 455/445, 455/456.1, 456.6, 428, 430, 414.2, 500, 521, 455/404.1, 404.2; 370/310, 310.2
See application file for complete search history.

(56) References Cited

U.S. PATENT DOCUMENTS

| 6,112,085 | A  | * | 8/2000  | Garner et al. | 455/428   |
| 6,253,129 | B1 | * | 6/2001  | Jenkins et al. | 701/29    |
| 6,301,480 | B1 | * | 10/2001 | Kennedy et al. | 455/445   |
| 6,411,806 | B1 | * | 6/2002  | Garner et al. | 455/428   |
| 6,496,702 | B1 | * | 12/2002 | Lockhart | 455/456.5 |
| 6,748,211 | B1 | * | 6/2004  | Isaac et al. | 455/414.1 |
| 6,847,825 | B1 | * | 1/2005  | Duvall et al. | 455/456.3 |
| 2002/0013150 | A1 | * | 1/2002 | McKenna et al. | 455/430   |

* cited by examiner

*Primary Examiner*—Sonny Trinh
(74) *Attorney, Agent, or Firm*—Donald R. Boys; Central Coast Patent Agency, Inc.

(57) ABSTRACT

A service communication system for mobile vehicles has a cellular telephony interface in individual ones of the mobile vehicles, for establishing telephony events over a cellular network with a base station, and a global positioning system in individual ones of the mobile vehicles for determining global position from transmissions from GPS satellites. A network of cellular base stations receives from and broadcasts to the mobile vehicles, and bridges events between cellular and public switched telephone service (PSTN) protocol. A unique network-level routing system is connected by first telephony trunks to the base stations and enabled to retrieve GPS position from the telephony events, and is connected by other trunks to a plurality of service centers connected to the network-level routing system, which determines a destination for individual ones of the telephony events among the plurality of service centers according to the retrieved GPS position.

8 Claims, 4 Drawing Sheets

METHOD AND APPARATUS FOR PROVIDING ENHANCED COMMUNICATION CAPABILITY FOR MOBILE DEVICES ON A VIRTUAL PRIVATE NETWORK (VPN)

The present application is a continuation of application Ser. No. 09/452,768, filed Dec. 1, 1999, now issued as U.S. Pat. No. 6,496,702, which is incorporated herein in its entirety.

FIELD OF THE INVENTION

The present invention is in the field of telephony communication as it pertains to mobile devices or units operating on a private network and pertains more particularly to methods and apparatus for enhancing communication capability, data transfer capability, and increasing the number of mobile devices that can successfully operate on a communication-center facilitated virtual private network (VPN).

BACKGROUND OF THE INVENTION

The field of telephony communication has grown more diverse and flexible. Call-in centers that once were restricted to connection-oriented switched telephony (COST) are now employing computer-simulated telephony techniques generally referred to as data network telephony (DNT). Call-in centers that are enhanced with DNT and multimedia capability more appropriately termed communication centers in the art. This is due to the broad range of telephony and data transfer capabilities that are routinely practiced within or facilitated by such centers.

Communication centers are often used by enterprises to accomplish cellular communication links with fleets of vehicles having wireless communication devices installed therein for receiving instruction and responding back to personnel operating within the center, such as dispatchers, sales agents and so on. There are a variety of existing techniques used by communication centers today to track, control and support fleets of vehicles.

Services such as Omnitracs™ operated by Qualcomm and On-Star™ operated by General Motors Corp. (GM) use the well-known cellular telephone infrastructure and the global positioning system (GPS) to track and support vehicles in the field. Services offered include such as air bag deployment notification, remote door unlocking, road-side service, vehicle theft notification, and so on. In some cases device-equipped vehicles are owned and operated by a single entity that also provides the service. In some cases vehicles are owned individually, or in small groups and are subscribed to a service.

A commonality among all of these types of service communication systems is that users (i.e. drivers of sub-scribed vehicles) may need to be periodically tracked by the system to be given logistics support, help or advice at some point during a trip. In some cases tracking is employed for reporting purposes to customers of the service business, such as with some trucking companies and the like. The above-described systems target mostly high-end vehicles or commercial fleets as primary targets, due to the higher value and traffic they incur.

One problem with the infrastructure associated with the above-described services is that communication with the volume of serviced cars or commercial fleet of vehicles is typically implemented by a single communication center. As a result the systems are limited to a relatively small volume vehicles depending on the nature of the service. Such a communication center, as is known in the art, simply cannot handle a really large volume, such as perhaps a million vehicles or more.

The technologies (GPS and cellular services) that support the above-described services are continually being developed and made available over ever-increasing geographic regions. Therefore, it is desirable to provide similar services to a much larger customer base than the currently limited numbers serviced by today's largest system/infrastructures. As previously described, a single communications center cannot handle the desired volume. For example, a service base of a million users or more would logically encompass mostly "normal citizens" rather than professional drivers due to shear volume. In this regard, services offered would have to be more diversified among users instead of being standardized as with a fleet of company-owned service vehicles. An unacceptable communication load would result in any single communication center. Moreover, other problems would arise from an overload of users interacting with a center such as increased costs of long-distance routing, and lack of "local knowledge" required to effect many desired and marketable services.

What is clearly needed is a method and apparatus that enables efficient data management and routing of service events to and from a large volume of tracked vehicles maintaining wireless communication devices, wherein specific interaction and routing does not have to be performed in or facilitated by one single communication center. Such a system would allow a single service to provide cost-effective, mainstream services to millions subscribers.

SUMMARY OF THE INVENTION

In a preferred embodiment of the present invention a service communication system for mobile vehicles is provided, comprising a cellular telephony interface in individual ones of the mobile vehicles, for establishing telephony events over a cellular network with a base station; a global positioning system in individual ones of the mobile vehicles for determining global position from transmissions from GPS satellites; a network of base stations for receiving and broadcasting to the mobile vehicles, and for bridging events between cellular and public switched telephone service (PSTN) protocol; a network-level routing system connected by first telephony trunks to the base stations and enabled to retrieve GPS position from the telephony events; and a plurality of service centers connected to the network-level routing system by second telephony trunks. The network-level routing system determines a destination for individual ones of the telephony events among the plurality of service centers according to the retrieved GPS position.

In preferred embodiments the network-level routing system further comprises an interactive voice solution (IVS) system for providing synthesized voice responses to incoming events. Also in preferred embodiments individual ones of the service centers each comprise a telephone switching apparatus connected by a computer telephony integration (CTI) link to a CTI processor for monitoring a controlling the connected telephone switching apparatus, and the network routing center comprises a network-level CTI processor connected to a network-level switch, and wherein the CTI processors at network and service center level are interconnected by a data link separate from the second telephony trunks. In some embodiments data about a call event is stripped at the network-level routing system and transmitted by the data link separate from the second telephony trunks to a service center to which the call event is routed.

In various embodiments of the invention taught in enabling detail below, services for mobile vehicles may for the first time be provided in a specialized way by having local service centers attuned to the needs of certain areas and for special purposes, and by routing service call events to specialized centers based on mobile vehicle location at the time service is requested.

BRIEF DESCRIPTION OF THE DRAWING FIGURES

DESCRIPTION OF THE PREFERRED EMBODIMENTS

Figure 1:
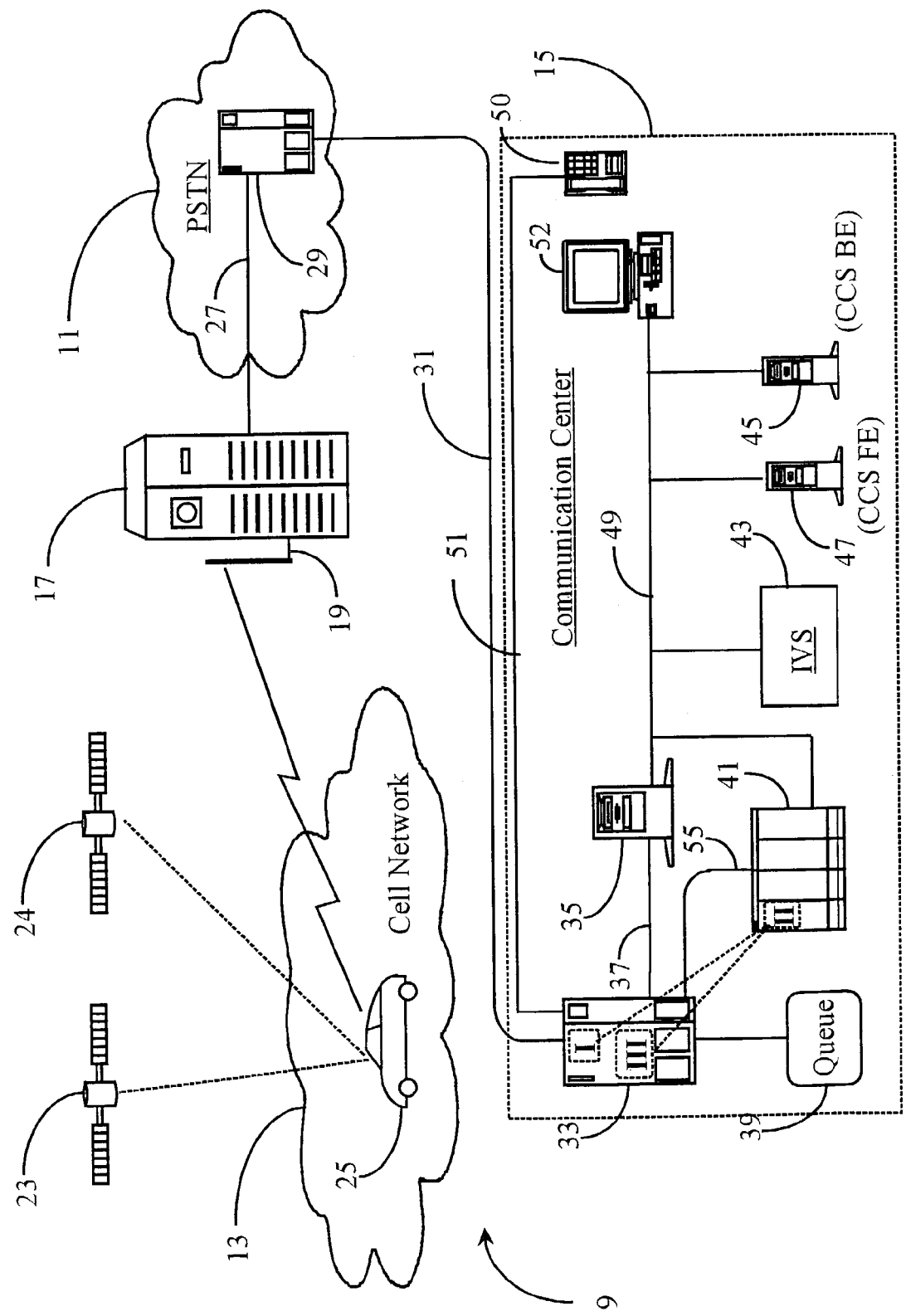
FIG. 1 is an overview of a mobile device communication network as known to the inventor illustrating typical routing points for a call event from a mobile device to a contact center.

FIG. 1 is an overview of a current-art mobile device communication-network 9 as known to the inventor illustrating typical routing points for a call-event from a mobile device to a contact center. Communication network 9 comprises a Cell network 13, which is in an area that has by in large also GPS coverage, a connected PSTN network 11, and a communication center 15. Cell network 13 represents the well-known cellular communications networks in an area with the well-known GPS system. These two technologies including their respective infrastructures are utilized by service communication centers such as center 15 to track and provide support to fleets of vehicles having both GPS devices and wireless communication devices installed therein. One vehicle of such a fleet of vehicles is represented herein by a car 25 illustrated within Cell network 13 and presumably with the GPS coverage.

PSTN network 11 may be another type of telephony network such as a private telephone network as may be known in the art. Communication center 15, also referred to as a contact center in the art, represents in this example a national service center that offers support and service to a fleet of vehicles as was defined in the background section. Center 15 utilizes PSTN network 11 and Cell networks 13 to facilitate communication and interaction between center 15 and an equipped vehicle such as car 25.

A network bridging (base) station 17 is provided and adapted in this example to convert wireless cellular calls into PSTN calls and PSTN calls into cellular calls. This shall be a grossly simplified view of elements as are well known in the art of telephony. Further details would obfuscate discussing the present invention and have hence been left out. Station 17 is equipped with all of the necessary hardware and software to accomplish this task as is known in the art. Station 17 has a transceiver/receiver device 19 connected thereto and adapted to pick-up and transmit cellular transmissions. Cellular communication from car 25 to center 15, or from center 15 to car 25 is routed, in this example, through the PSTN network 11.

Communication center 15 has installed therein a central telephony switch 33, which may be an ACD or PBX type switch. Switch 33 is adapted to function as a first destination for inbound call events originating from such as car 25, or from other sources within PSTN 11. Switch 33 is CTI (computer telephony integration) enhanced by a CTI processor 35 connected thereto by a CTI link 37. Such enhancement provides status and event monitoring of the switch, and switch function control, such as intelligent routing control. For example, switch 33 functions in this embodiment as a private service control point (SCP) with agent/system level routing intelligence for routing to various points within center 15.

A modem pool 41 is provided and adapted to strip data from inbound and outbound call events processed at center 15. Modem pool 41 is connected to switch 33 by an internal telephony trunk 55, and to an internal, interconnecting local area network (LAN) 49, which interconnects several internal elements as described below, including the CTO processor 35. Modem pool 41 represents a second "data" routing point within communication center 15.

An interactive voice solution (IVS) machine 43 is provided and adapted to interact with customer's calls and contacts, and to process certain aspects of data in incoming calls to synthesized voice, which may go to an agent or back to a subscriber's vehicle. IVS 43 connects on LAN 49. In this way IVS 43 is controlled to respond to call events according to event protocols.

A front-end communication-center server (CCS FE) 45 is provided and adapted to process workflow for incoming non-real-time events. Server 45 is connected to CTI processor on LAN 49 and is controlled by processor 35. A back-end communication-center server (CCS BE) 47 is provided and adapted to process workflow for non-real-time outgoing events. Server 47 is connected to server 45 and also to IVS 43 on LAN 49. An agent's telephone 50 is provided at an agent station and adapted to enable live voice communication between such as car 25 and an agent operating within center 15. Telephone 50 is connected to switch 35 by internal telephone wiring 51. In other embodiments, an IP phone may be used connected to a LAN (e.g. LAN 49). A communication queue 39 is provided in switch 33 for incoming call events that are waiting for pickup by an available agent such as one operating telephone 50. It will be apparent to one with skill in the art that in a service communication center such as center 15, there will be many more agent's telephones than the one telephone 50 illustrated herein. Moreover, agents may also be operating local area network (LAN) connected terminals at the agent stations, such as terminal 52 shown, having graphical user interfaces (GUI) along with processing and data input capabilities. Such terminals may be personal computers (PCs) or other adapted machines.

It is noted here that the equipment and connections illustrated within communication center 15 in this embodiment represent such as apparatus connection and control schemes known to the inventor and is not yet widely available in the art to be termed prior art. It will be apparent to the skilled artisan that there are alternative architectures that might be used for the interconnection of operational elements in the communication center.

As described in the background section, large commercial fleets, such as trucking fleets, as well as private subscribers operating private vehicles are facilitated in terms of GPS tracking and cellular support by a single national communication center. Such is the case represented here. Because of this only a limited number of vehicles, perhaps up to a few thousands, may be adequately serviced without severely straining the resources of a national center such as center 15. Moreover, routing within a center such as center 15 may be somewhat complicated depending on the nature of events and services offered.

In this example a typical routing path is illustrated for a call event arriving to center 15 from car 25. Such a call event may be an automatically triggered data request, a voice/data request, or a voice call. It is important to note here that the modem communication between such as modem pool 41 and a modem installed in car 25 follows such as Analog Display Services Interface (ADSI) protocols or equivalents. Hence, the connection has two states; one being a voice connection and the other being a data connection using an A/B toggle switch at each modem with control afforded to communication center 15.

An inbound event is broadcast from car 25, received by receiver/transceiver 19 and transmitted to station 17 where it is converted to a PSTN call. Typically, because of the nature of the subscription service, being highly dependent in many instances on the location of the vehicle originating an event, data regarding global positioning is sent with the call event. This data is available to the system in the vehicle by GPS interface which operates, as is known in the art, by monitoring transmission from multiple satellites, represented here by satellites 23 and 24, and triangulation calculations. In some cases, because, for example, a vehicle having initiated an event continues to move, the position has to be updated, which may be done periodically as a function of the vehicle system, or may be triggered from a remote station. In any event, the GPS position information is transmitted via the cell network.

Once on PSTN 11, the event is routed to switch 29. The event is then switched to central switch 33 at the communication center at a first agent-level routing point I over telephony trunk 31. Routing point I is a private SCP equivalent implemented at center 15. Once the event reaches routing point I, the nature of the event is determined (ANI/DNIS). In this example, we assume the event is a data call requiring a non-real-time or automated response, and the GPS arrives with the call event. Call nature determination and further routing is controlled by CTI processor 35 running CTI software adapted for the purpose. It is important to note here that every inbound event is routed to a routing point II (modem pool 41) over trunk 55. Routing point II, which is at modem pool 41, strips the data from the event, including the GPS location of car 25 at the time of event initiation.

Also, certain data about the call may be passed to Customer Client-Server workflow engine Front End (CCS FE) server 45 over LAN 49 for front-end processing. Data about the event passes from server 45 to Customer Client-Server workflow engine Back End(CCS BE) server 47 for back-end processing. Processed data, which reflects the command disposition of the event, passes from server 47 into IVS 43 for processing, if required, into synthesized voice instruction, which will become part of an outbound event. The Voice package necessitated is passed to modem pool 41 and an outbound event is created and forwarded to a routing point III. Hence, an outbound call event representing a synthesized voice response to the original request is routed back over trunk 31 into switch 29 in PSTN 11. The response event is then routed to station 17 over line 27 where it is converted back to a cellular protocol and broadcast by transceiver/receiver 19 to car 25 where a motorist receives it.

Returning to routing point III, if the original event required or requested a live agent communication, the caller would either be connected to an available agent at, for example, telephone 50, or, if none were available, be placed in queue 39. An agent at telephone 50 will typically have access as well to a computer station 52 having a video display unit (PC/VDU), and the system may provide display for the agent related to telephony events. However, the voice aspect of a live event is not connected until all data is stripped and processed. Communication center 15, through server 35, controls the voice/data aspect of each event.

Because communication center 15 in this example is a national center handling all subscribing vehicles nation wide, events may have to be routed over long distances through PSTN 11 to a local cell network. Another issue is that one national center such as center 15 may not be up to date on recent local changes transpiring in the vicinity of car 25. For example, if the original request was for a list of local motel vacancies in the immediate area of car 25, center 15 may not have the recent listings or information on any new locations just opened for business. If, for example, the original request was for an emergency towing service, a national center may not know that car 25 is only a few miles from a recently opened service and may recommend a more distant provider causing added expense for the motorist.

It will be apparent to one with skill in the art that a communication network wherein a single national center must facilitate communication with a nationally spread-out fleet of vehicles, will have substantial limitations with respect to providing accurate knowledge of local resources and with providing routing of events over long distance wired networks.

Figure 2:
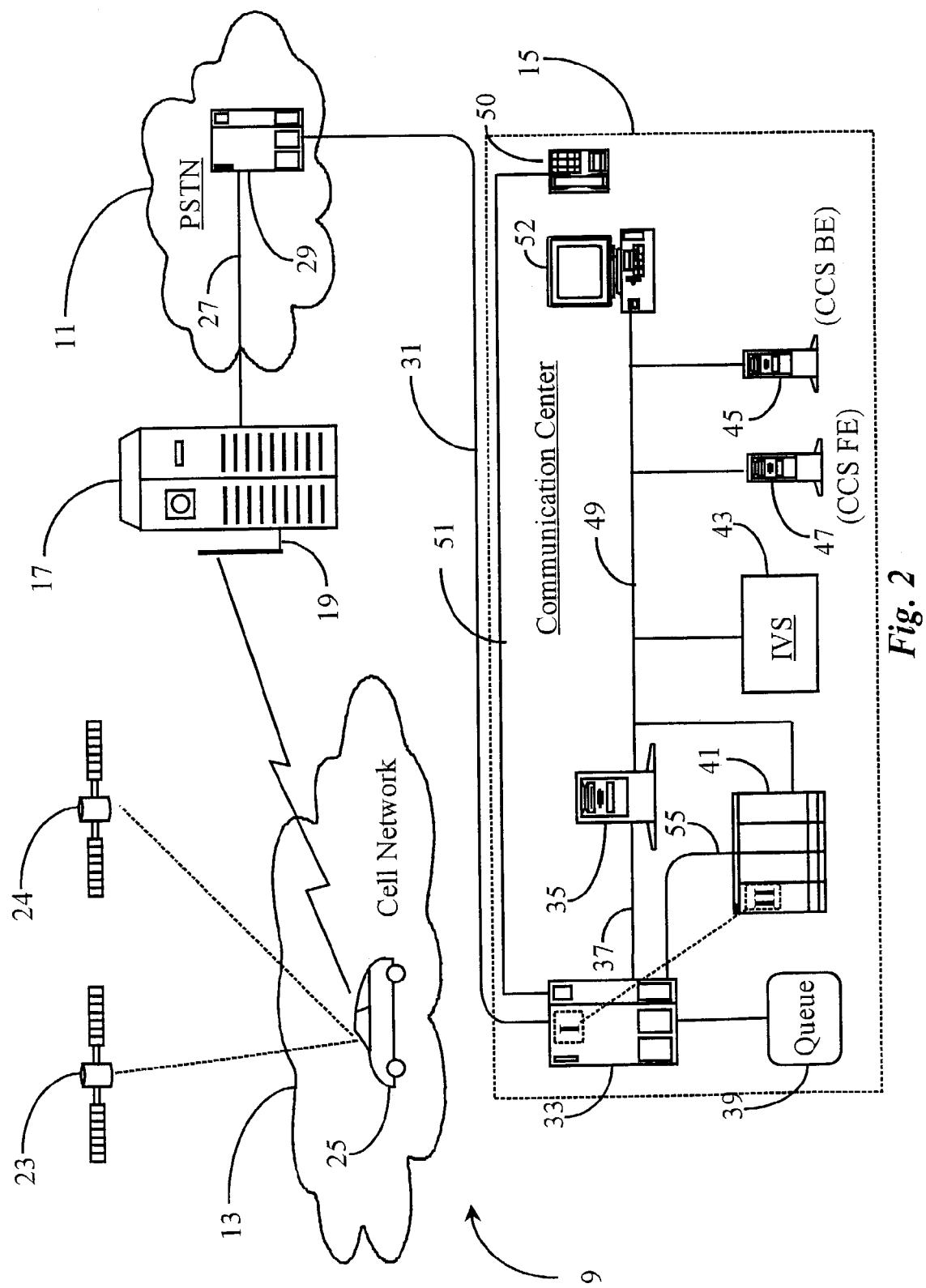
FIG. 2 is an overview of the mobile device communication network of FIG. 1 illustrating typical routing points for incoming voice calls into the contact center of FIG. 1.

FIG. 2 is an overview of the mobile device communication network 9 of FIG. 1 as known to the inventor illustrating typical routing points for an incoming voice call into the contact center of FIG. 1. As the elements involved in this embodiment are analogous to those described in FIG. 1, reintroduction of such elements will not be made.

In this embodiment, we assume that car 25 places a live voice call for an agent at communication center 15. A voice call is initiated from car 25 using the voice mode on the associated modem. Initial call routing is analogous to FIG. 1. For example, transceiver/receiver 19 picks up the event and passes it into station 17 where it is converted to a PSTN call. The event is then routed over trunk 27 to switch 29 in network 11. Techniques typically using ANI/DNIS cause routing of the event over trunk 31 to switch 33 (SCP). At this point the voice nature of the call is determined, and the call is routed first to an available agent as a PSTN-connected call. Notification is given by the agent to the vehicle operator that he or she requires data communications with the vehicle and will be placed on hold for reconnection. This may be accomplished by a voice-synthesized message.

The event is then routed to routing point II (modem pool 41) and the agent operating telephone 50 is placed on hold. This process must be performed so that any data associated with the live call request may be stripped by modem pool 41 and processed, including obtaining a read on car location per the GPS system if necessary. Once the data is processed by servers 45 and 47 as described above with reference to FIG. 1, the agent at telephone 50 is reconnected to the caller in voice mode. If the agent becomes unavailable while data is being processed, then the inbound call event may be routed to queue 39 to wait for reconnection to a different agent.

It will be apparent to one with skill in the art that internal routing wherein the modem at communication center 15 must be re-linked back into the call flow in order to complete a voice call is rather complicated and uses significant resources. The modem at communication center 15 must issue a dual-tone-multiple-frequency (DTMF) or other suitable non-DTMF tone to switch the connection-state from voice to data and then back to voice as is known in the art with ADSI type modem-interfaces. Moreover, as communication network 9 is identical to the one described in FIG. 1, the same limitations apply that were described in FIG. 1.

Figure 3:
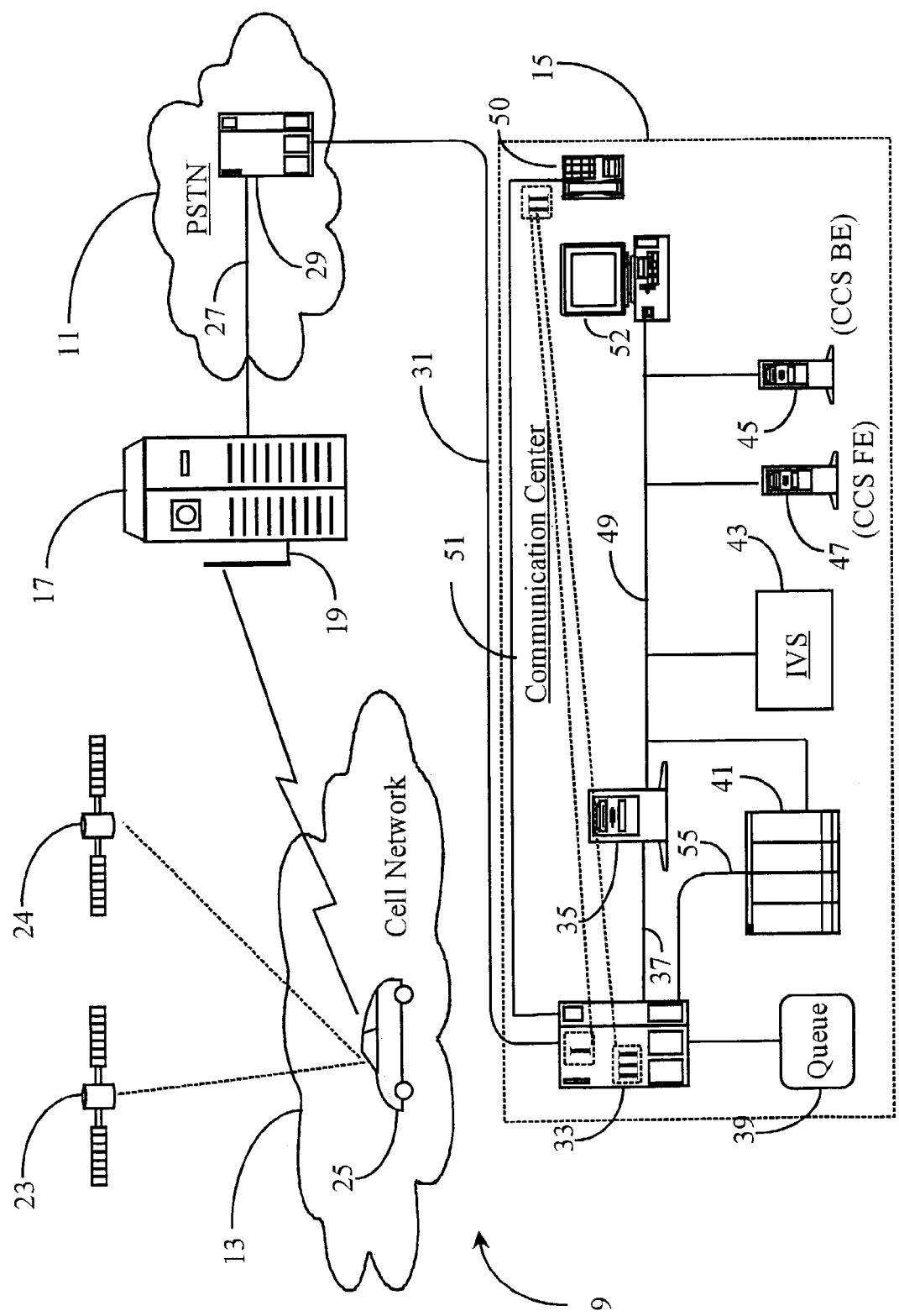
FIG. 3 is an overview of the mobile device communication network of FIG. 1 illustrating typical routing points for a call event to a car from a PSTN through the contact center of FIG. 1.

FIG. 3 is an overview of the mobile device communication network 9 of FIG. 1 illustrating typical routing points for a call event to a car from a PSTN from the contact center of FIG. 1. In this example as in the example of FIG. 2, elements of communication network 9 remain the same as previous embodiments and therefore, will not be reintroduced. The example provided herein represents the routing path associated with a PSTN call to car 25 in Cell network 13.

A call event represented by a vector 30 arrives at switch 29 in PSTN 11. ANI and DNIS information indicates that the event is destined to communication center 15. It is assumed that in this embodiment center 15, which is a national center, must facilitate the call. This is typical of services of the type described in the background section.

Event 30 is routed from switch 29 over trunk 31 to switch 33 at communication center 15. Because it is a conventional PSTN call, it may be routed directly to an agent (routing point II) such as one operating telephone 50. The agent operating telephone 50 may further direct the call based on information supplied by the caller such as car identification number. In some cases a car identification number may be part of the call identification data. Based on the call data and agent input data, event 30 is routed back to switch 33 as an outbound call to car 25. This employs the workflow process represented by servers 45 and 47 along with IVS 43 which instructs modem pool 41 to dial car 25. Therefore, a third routing point is at switch 33, which represents an outbound call in progress. The agent operating telephone 50 may or may not stay with the caller during this process. The outbound call is routed back through PSTN 11, through bridging station 17 and onto car 25 through Cell network 13. When the motorist operating car 25 picks up, he is connected to the waiting PSTN event.

It will be apparent to one with skill in the art that limitations exist with respect to communication network 9 described in FIGS. 1–3 including routing complexity, long distance costs, lack of local knowledge to aid motorists, and so on.

The above FIGS. 1–3 describe a current-art communication network that uses the GPS system and the cellular network along with the PSTN to enable national centers such as center 15 to communicate with motorists and on-board systems that may be associated with a subscribed car such as car 25.

A communication network such as network 9 may utilize a virtual private network (VPN) comprising multiple wireless carriers and land networks as is known in the art. Therefore, networks 13 and 11 may be assumed to represent multiple wireless and land-line networks spread over large geographic areas. Even with VPN access, which limits some long distance charges, routing to one national center such as center 15 is still complicated.

Figure 4:
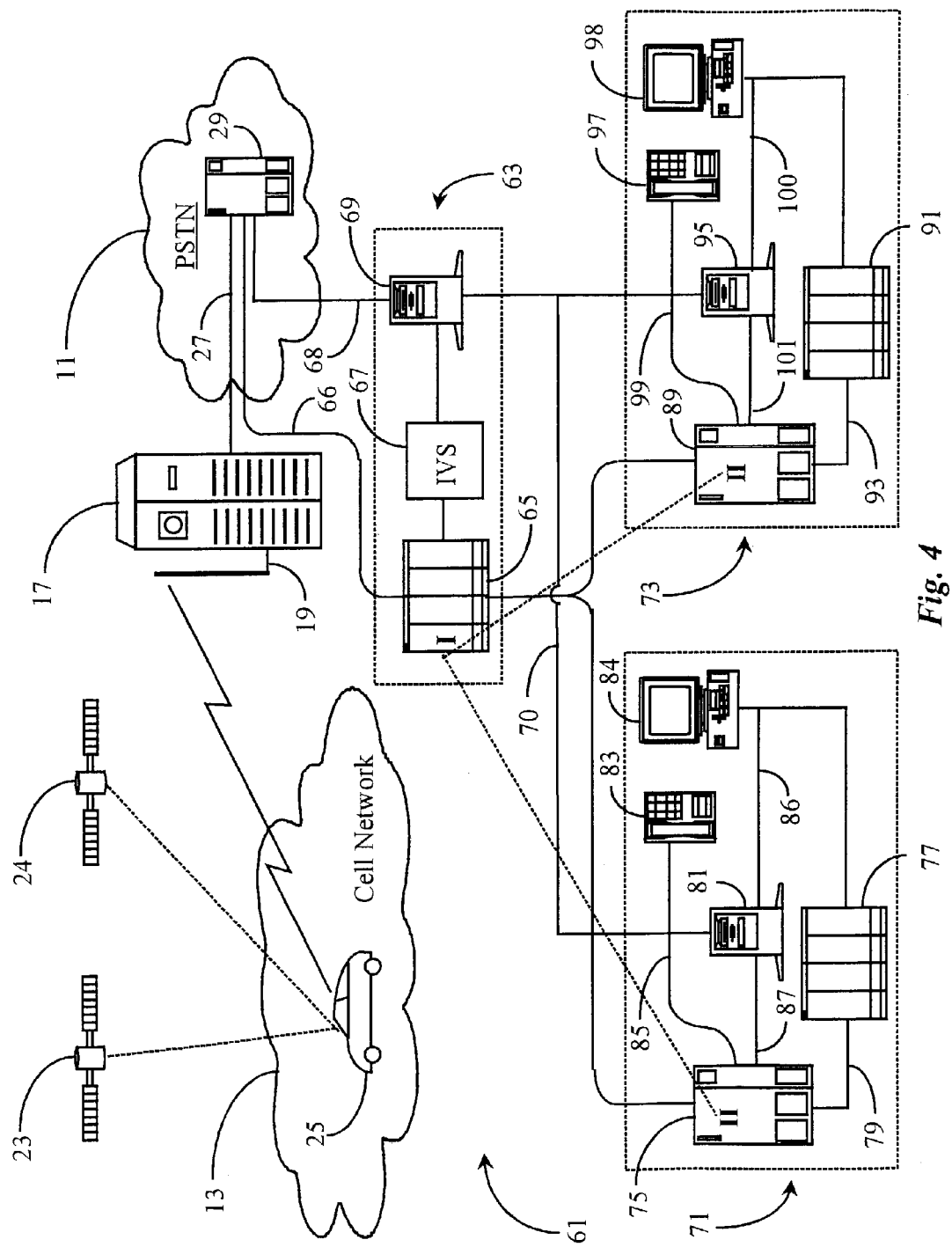
FIG. 4 is an overview of a mobile device communication network enhanced with network data control and routing control according to an embodiment of the present invention.

FIG. 4 is an overview of a mobile device communication network 61 enhanced with network data control and routing control system 63 according to an embodiment of the present invention. New elements are introduced in this preferred embodiment. Such elements provide enhancement to overall performance and efficiency for the entire system.

In this example, instead of utilizing one single, national communication center to facilitate communication as is illustrated in current-art examples with reference to FIGS. 1–3, the inventor illustrates a unique and novel network system 61, which uses multiple, distributed communication-centers, illustrated herein as centers 71 and 73, and places data control and voice/data switching capability at the network level, illustrated by a VID packet 63. For clarity, not all the elements explained before are shown in the drawing but may or may not be present in each one of the centers.

Communication center 71 comprises a central switch 75, a modem pool 77, a CTI processor 81, a representative telephone 83, and a representative PC/VDU 84. The separate elements are connected through a LAN 86, and a trunk 79 connects switch 75 to modem pool 77. IVS and CCS implementations as shown in communication center 15 of FIGS. 1–3 may be assumed to be present, but are not shown. Communication center 73 is in this embodiment is identical to center 71, comprising a central switch 89, a modem pool 91, a CTI processor 95, a representative telephone 97, a representative PC/VDU 97, a LAN 100, and a trunk 93. In center 71, switch 75 is connected to CTI processor 81 by a CTI link 87. Modem pool 77 is connected to switch 75 by internal telephone wiring 79. Telephone 83 is connected to switch 75 by internal telephone wiring 85. In center 73, switch 89 is connected to CTI processor 95 by a CTI link 101. Modem pool 91 is connected to switch 89 by internal telephone wiring 93. Telephone 97 is connected to switch 89 by internal wiring 99.

Centers 71 and 73 represent local distributed communication service centers provided by an enterprise hosting a mainstream service and therefore may be significantly smaller in size (number of agents, modems, workstations, etc.) than one large national center. An object of the present invention is to provide distributed centers such as centers 71 and 73 to allow for a much higher service capability (number of vehicles) than is possible with current art systems.

VID packet 63 is provided and operates at PSTN network level. Packet 63 is in this example is an equipment grouping that handles GPS, voice/data switching, and workflow processing activity, which was in previous examples provided within a national communication center such as center 15 of FIGS. 1–3. Packet 63 comprises a modem pool 65, an IVS machine 67, and a CTI processor 69. CTI processor 69 is connected to switch 29 by a CTI link 68. This connection provides CTI monitoring and control over switch 29 such that it may be used in many enhanced ways, including as a private SCP. By placing VID packet 63 in the network, GPS location data may be utilized at the network level instead of from within a communication center. Voice and data switching and interactive voice/data control is also performed at network level by modem pool 65 and associated IVS 67.

In a preferred embodiment of the present invention, an inbound call event from car 25 is received at a local bridging station such as station 17 by way of transceiver/receiver 19 and is converted to a PSTN call event as was described in previous examples. It is assumed for this example that the incoming call event includes data for GPS position. In some embodiments there may be a function for updating position by automatic pinging back through the system to the vehicle. The call event arrives at switch 29 over trunk 27 also as previously described. Here the similarity ends with respect to previously described routing means and data handling.

Data from such a call event is passed over data-network connection 68 to processor 69 in VID packet 63. The call event is routed to modem pool 65 over trunk 66. Modem pool 65 represents a routing point I, which is a pre-center routing point. GPS location data associated with car 25 is accessed by modem pool 65. Data about the call event is stripped by modem pool 65 and processed by IVS 67. By utilizing VID capability at the network level, now the inbound call event from car 25 may be routed to either center 71 or center 73 (or another call center) whichever is more appropriate. In many cases the appropriate center will be the closest center to car 25, and the GPS data may be used to make the routing decision. An event such as an inbound event sourced from car 25 arrives at either center 71 or 73 by way of telephony trunk 72 out of modem pool 65 in the network. Other items may be used in considering the routing, as are well known in agent skill level routing, customer requirement routing etc.

Routing points II illustrated at switch 75 (center 71) and switch 89 (center 73) are optional routing points depending on which center will be designated to receive the inbound event. Data about the inbound event is passed to the appropriate communication center over a separate data network represented by path 70 connecting processors 69, 81 and 95. Processors 81 and 95 control further routing, at centers 71 and 73, respectively.

Now GPS location is available as a determinant in routing to various call centers. This position information has other novel uses as well. Data processing and voice/data switching is performed at network level according to CTI routines for inbound events. Therefore, the ratio of modems to agents at each center may be significantly reduced. Call events arriving from anywhere in PSTN 11 may also be handled at network level. Modem pools 71 and 73 handle outbound traffic in normal fashion as well as providing voice/data switching.

The method and apparatus of the present invention may be integrated into existing VPN networks without departing from the spirit and scope of the present invention. In this way, multiple wireless carriers as well as land connections may be utilized in routing. Inbound events are routed intelligently by virtue of processors 69 (network), 81 (center 71), 95 (center 73), utilizing a separate data network illustrated by network connections 68 and 70. As a result, inbound routing decisions may be based on a variety of criteria such as load balancing requirements, statistical routing, routing according to least expensive path, routing according to defined service, routing by agent skill, and so on.

In one embodiment of the present invention, a wide area network such as the Internet packet-data network may be utilized and integrated as a data/voice carrier. For example, an Internet-based service may be available for owners of subscribed vehicles to plan such as vacation trips or the like. Such data may be configured and uploaded to an Internet server and tagged to a particular vehicle. At the time of the trip the plans can be included in a series of inbound data calls to such as car 25 from the Internet. Of course, the appropriate DNT/PSTN bridge is required in order to interface switch 29 with the source data events.

GPS may also be used to trigger portions of a trip plan to be broadcast to car 25. For example, car 25 reaches a certain point (GPS location, latitude or longitude as more broad lines along the planned trip route). Periodic pinging of the GPS system may be used to approximate the correct location of car 25 along a route. When such location data closely matches data included in the trip plan, an automated data call from the Internet carrying the appropriate data for the matching location would be processed as an inbound call event to the appropriate communication center. That center could then generate an outbound data call to car 25 that may include locations and directions for local motels, restaurants, banks, supermarkets, camp sites, and so on. There are many possibilities. Businesses and service providers such as auto towing, truck stops, rest areas, and the like may advertise to customers through local centers.

In some cases, the location of a requested service may effect network-level routing of an inbound call request. For example, if during travel, a subscriber such as one driving car 25 requests knowledge of a nearest hospital that provides emergency services, then a network-level SCP may, after pinging for GPS position, route the event to a local communication center known to have knowledge of a name, location and directions to a nearest hospital that matches the request. Such data would, of course, have to be known at network level such as by a connected data repository adapted for the purpose.

It will be apparent to one with skill in the art that a communication/service network such as network 61 can provide service to more vehicles by virtue of utilizing multiple communication centers than can be handled by a single communication center. It will also be apparent to one with skill in the art that such multiple centers as described above can provide more specific and updated information by virtue of being in close vicinity to the services requested, and local centers may be specialized to local services, and so on.

The methods and apparatus of the present invention may be practiced over standard Cell/PSTN networks or may be integrated into a VPN comprising multiple carriers. Likewise integration into such as the Internet or other WAN or G3-type digital networks is possible. Therefore, the method and apparatus of the present invention should be afforded the broadest scope. The method and apparatus of the present invention is limited only by the claims that follow.

What is claimed is:

1. A service communication system for mobile vehicles, comprising:

a cellular telephony interface in individual ones of the mobile vehicles, for establishing telephony events over a cellular network with a base station;

a global positioning system in individual ones of the mobile vehicles for determining global position from transmissions from GPS satellites;

a network of base stations for receiving and broadcasting to the mobile vehicles, and for bridging events between cellular and public switched telephone service (PSTN) protocol;

a network-level routing system connected by first telephony trunks to the base stations and enabled to retrieve GPS position from the telephony events; and a plurality of service centers connected to the network-level routing system by second telephony trunks;

wherein the network-level routing system determines a destination for individual ones of the telephony events among the plurality of service centers according to the retrieved GPS position.

2. The system of claim 1 wherein the network-level routing system further comprises an interactive voice solution (IVS) system for providing synthesized voice responses to incoming events.

3. The system of claim 1 wherein individual ones of the service centers each comprise a telephone switching apparatus connected by a computer telephony integration (CTI)

link to a CTI processor for monitoring a controlling the connected telephone switching apparatus, and the network routing center comprises a network-level CTI processor connected to a network-level switch, and wherein the CTI processors at network and service center level are interconnected by a data link separate from the second telephony trunks.

4. The system of claim 3 wherein data about a call event is stripped at the network-level routing system and transmitted by the data link separate from the second telephony trunks to a service center to which the call event is routed.

5. In a service communication system for mobile vehicles having a cellular telephony interface in individual ones of the mobile vehicles, for establishing telephony events over a cellular network with a base station, a global positioning system in individual ones of the mobile vehicles for determining global position from transmissions from GPS satellites, and a network of base stations for receiving and broadcasting to the mobile vehicles, and for bridging events between cellular and public switched telephone service (PSTN) protocol, a method for enhancing services to the mobile vehicles, comprising Steps of:
  (a) providing a plurality of service centers specialized to particular regions; and
  (b) implementing a network-level routing system connected by first telephony trunks to the base stations and enabled to retrieve GPS position from the telephony events; and
  (c) routing individual ones of the telephony events among the plurality of service centers according to the retrieved GPS position.

6. The method of claim 5 wherein the network-level routing system further comprises an interactive voice solution (IVS) system for providing synthesized voice responses to incoming events.

7. The method of claim 5 wherein individual ones of the service centers each comprise a telephone switching apparatus connected by a computer telephony integration (CTI) link to a CTI processor for monitoring a controlling the connected telephone switching apparatus, and the network routing center comprises a network-level CTI processor connected to a network-level switch, and wherein the CTI processors at network and service center level are interconnected by a data link separate from the second telephony trunks.

8. The method of claim 7 wherein data about a call event is stripped at the network-level routing system and transmitted by the data link separate from the second telephony trunks to a service center to which the call event is routed.

* * * * *

UNITED STATES PATENT AND TRADEMARK OFFICE
CERTIFICATE OF CORRECTION

| | | |
|---|---|---|
| PATENT NO. | : 6,987,977 B2 | Page 1 of 1 |
| APPLICATION NO. | : 10/323450 | |
| DATED | : January 17, 2006 | |
| INVENTOR(S) | : Stanford Wayne Lockhart | |

It is certified that error appears in the above-identified patent and that said Letters Patent is hereby corrected as shown below:

On the Title Page:
Insert item (60) below item (63) as follows:

-- (60) Provisional application No. 60/147,685, filed on Aug. 6, 1999. --

In the Specification:
Replace the paragraph located at column 1, lines 7-10, with the following:

The present invention is a continuation of application Ser. No. 09/452,768, filed Dec. 1, 1999, now issued as U.S. Pat No. 6,496,702, which is incorporated herein in its entirety. Application No. 09/452,768 claims the benefit of provisional application Ser. No. 60/147,685, filed on Aug. 6, 1999.

Signed and Sealed this
Twenty-ninth Day of September, 2015

Michelle K. Lee
*Director of the United States Patent and Trademark Office*